US011593563B2

(12) United States Patent
Sawyer et al.

(10) Patent No.: US 11,593,563 B2
(45) Date of Patent: Feb. 28, 2023

(54) SYSTEMS AND METHODS FOR GENERATING TEXTUAL INSTRUCTIONS FOR MANUFACTURERS FROM HYBRID TEXTUAL AND IMAGE DATA

(71) Applicants: Scott Sawyer, Auburndale, MA (US); Jason Ray, Boston, MA (US); Dana Wensberg, Gloucester, MA (US); Roger Maranan, Boston, MA (US)

(72) Inventors: Scott Sawyer, Auburndale, MA (US); Jason Ray, Boston, MA (US); Dana Wensberg, Gloucester, MA (US); Roger Maranan, Boston, MA (US)

(73) Assignee: Paperless Parts, Inc., Boston, MA (US)

( * ) Notice: Subject to any disclaimer, the term of this patent is extended or adjusted under 35 U.S.C. 154(b) by 407 days.

(21) Appl. No.: 16/733,703

(22) Filed: Jan. 3, 2020

(65) Prior Publication Data
US 2020/0218858 A1    Jul. 9, 2020

Related U.S. Application Data

(60) Provisional application No. 62/789,911, filed on Jan. 8, 2019.

(51) Int. Cl.
*G06F 40/30* (2020.01)
*G06F 40/284* (2020.01)
(Continued)

(52) U.S. Cl.
CPC ............ *G06F 40/30* (2020.01); *G06F 40/117* (2020.01); *G06F 40/284* (2020.01); *G06N 20/00* (2019.01); *G06V 10/40* (2022.01); *G06V 30/10* (2022.01)

(58) Field of Classification Search
CPC ...... G06F 40/30; G06F 40/117; G06F 40/284; G06F 40/169; G06F 40/279; G06F 40/56;
(Continued)

(56) References Cited

U.S. PATENT DOCUMENTS 8,135,484 B2    3/2012  Yamazaki et al.
8,738,410 B2    5/2014  Cogswell et al.
(Continued)

FOREIGN PATENT DOCUMENTS

WO    2018078590    5/2018

OTHER PUBLICATIONS

Ziqi Zhang, Philip Webster, Victoria Uren, Andrea Varga, and Fabio Ciravegna, Automatically Extracting Procedural Knowledge from Instructional Texts using Natural Language Processing, 2006 http://citeseerx.ist.psu.edu/viewdoc/download?doi=10.1.1.682.1931&rep=rep1&type=pdf.

(Continued)

*Primary Examiner* — Thierry L Pham
(74) *Attorney, Agent, or Firm* — Caldwell Intellectual Property Law, LLC

(57) ABSTRACT

A system for generating textual instructions for manufacturers from hybrid textual and image data includes a manufacturing instruction generator that may generate a language processing module from a first training set including at least a training annotated file describing at least a first product to manufacture, the at least an annotated file containing one or more textual data, and at least an instruction set containing one or more manufacturing instructions to manufacture the at least a first product. Manufacturing instruction generator may use the language processing to generate textual instructions for manufacturers from at least an annotated file and may initiate manufacture using the generated manufacturing instructions.

20 Claims, 6 Drawing Sheets

(51) Int. Cl.
  *G06F 40/117* (2020.01)
  *G06N 20/00* (2019.01)
  *G06V 10/40* (2022.01)
  *G06V 30/10* (2022.01)

(58) Field of Classification Search
  CPC ........ G06N 20/00; G06N 5/003; G06N 7/005; G06N 20/10; G06N 20/20; G06V 10/40; G06V 30/10; G06V 2201/10; G06K 9/6201; G06K 9/6256
  USPC .......................................................... 704/9
  See application file for complete search history.

(56) References Cited

U.S. PATENT DOCUMENTS

| | | | |
|---|---|---|---|
| 8,898,169 B2 | 11/2014 | Gokturk et al. | |
| 9,390,378 B2 | 7/2016 | Garera et al. | |
| 9,514,434 B2 | 12/2016 | Krauter et al. | |
| 11,161,307 B1 * | 11/2021 | Brungardt | H04L 69/16 |
| 2014/0297357 A1 | 10/2014 | Zeng et al. | |
| 2016/0196036 A1 | 7/2016 | Mathon et al. | |
| 2017/0083615 A1 | 3/2017 | Boguraev et al. | |
| 2017/0178014 A1 | 6/2017 | Sarferaz | |
| 2018/0018310 A1 | 1/2018 | Unsal | |
| 2018/0075104 A1 | 3/2018 | Oberbreckling et al. | |
| 2018/0120813 A1 | 5/2018 | Coffman et al. | |
| 2018/0300793 A1 | 10/2018 | Chen et al. | |
| 2021/0201078 A1 * | 7/2021 | Yao | G06N 3/08 |

OTHER PUBLICATIONS

Brent Dawkins, blog, Apr. 19, 2018 https://www.manufacturing.net/blog/2018/04/now-time-machine-learning-manufacturing.

* cited by examiner

400

```
┌─────────────────────────────────────────────────────────────┐
│ Generating, from a Dataset Including a Plurality of Textual │ 405
│ Data Extracted from Annotated Files Describing Products to  │
│ Manufacture and a Plurality of Correlated Textual           │
│ Instructions for Manufacturers, at Least a Language Model,  │
│ wherein the at Least a Language Model Receives Textual Data │
│ as Inputs and Produces Textual Instructions for             │
│ Manufacturers as Outputs                                    │
└─────────────────────────────────────────────────────────────┘
                              │
                              ▼
┌─────────────────────────────────────────────────────────────┐
│ Receiving at Least a Geometric Model and at Least an        │ 410
│ Annotated File Describing at Least a Product to Manufacture │
└─────────────────────────────────────────────────────────────┘
                              │
                              ▼
┌─────────────────────────────────────────────────────────────┐
│ Extracting One or More Words from the at Least an           │ 415
│ Annotated File                                              │
└─────────────────────────────────────────────────────────────┘
                              │
                              ▼
┌─────────────────────────────────────────────────────────────┐
│ Determining at Least an Interrogator Output from the at     │ 420
│ Least a Geometric Model                                     │
└─────────────────────────────────────────────────────────────┘
                              │
                              ▼
┌─────────────────────────────────────────────────────────────┐
│ Generating at Least a Textual Instruction from the          │ 425
│ Extracted Words Using the at Least a Language Model and the │
│ at Least an Interrogator Output                             │
└─────────────────────────────────────────────────────────────┘
```

*FIG. 4*

SYSTEMS AND METHODS FOR GENERATING TEXTUAL INSTRUCTIONS FOR MANUFACTURERS FROM HYBRID TEXTUAL AND IMAGE DATA

CROSS-REFERENCE TO RELATED APPLICATIONS

This application claims the benefit of priority of U.S. Provisional Patent Application Ser. No. 62/789,911, filed on Jan. 8, 2019, and titled "SYSTEMS AND METHODS FOR GENERATING MANUFACTURING INSTRUCTIONS FROM HYBRID TEXTUAL AND IMAGE DATA," which is incorporated by reference herein in its entirety.

FIELD OF THE INVENTION

The present invention generally relates to the field of automated manufacturing processes. In particular, the present invention is directed to systems and methods for generating textual instructions for manufacturers from hybrid textual and image data.

BACKGROUND

Designers of items to manufacture frequently submit designs in the form of files having images of the items to manufacture, plus handwritten or typed words indicating how they want manufacturing to proceed. The problem that this creates is that different designers may use terms differently, and not everybody knows what each term means. This means that the typical method of producing textual instructions for manufacturers is both laborious and inaccurate. The resulting manufacturing process can require frequent manual intervention and correction.

SUMMARY OF THE DISCLOSURE

In an aspect, a method of generating textual instructions for manufacturers includes generating, from a dataset including a plurality of textual data extracted from annotated files describing products to manufacture and a plurality of correlated textual instructions for manufacturers, at least a language model, wherein the at least a language model receives textual data as inputs and produces textual instructions for manufacturers as outputs. The method includes receiving at least a geometric model 136 and at least an annotated file describing at least a product to manufacture. The method includes extracting, by the manufacturing instruction generator, one or more words from the at least a first annotated file. The method includes determining at least an interrogator output from the at least a geometric model. The method includes generating at least a textual instruction from the extracted words using the at least a language model and the at least an interrogator output.

In another aspect, a system for generating textual instructions for manufacturers from hybrid textual and image data includes a computing device designed and configured to generate, from a dataset including a plurality of textual data extracted from annotated files describing products to manufacture and a plurality of correlated textual instructions for manufacturers, at least a language model, wherein the at least a language model receives textual data as inputs and produces textual instructions for manufacturers as outputs, receive at least a geometric model and at least an annotated file describing at least a product to manufacture, extract one or more words from the at least a first annotated file, determine at least an interrogator output from the at least a geometric model, and generate at least a textual instruction from the extracted words using the at least a language model and the at least an interrogator output.

In another aspect, a non-transitory machine-readable storage medium containing machine-executable instructions for estimating manufacturing parameters, the machine-executable instructions including generating, from a dataset including a plurality of textual data extracted from annotated files describing products to manufacture and a plurality of correlated textual instructions for manufacturers, at least a language model, wherein the at least a language model receives textual data as inputs and produces textual instructions for manufacturers as outputs, receiving at least a geometric model and at least an annotated file describing at least a product to manufacture, extracting, by the manufacturing instruction generator, one or more words from the at least an annotated file, determining at least an interrogator output from the at least a geometric model, and generating at least a textual instruction from the extracted words using the at least a language model and the at least an interrogator output.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 4 is a flow diagram illustrating an exemplary embodiment of a method of generating textual instructions for manufacturers from hybrid textual and image data;

Figure 1:
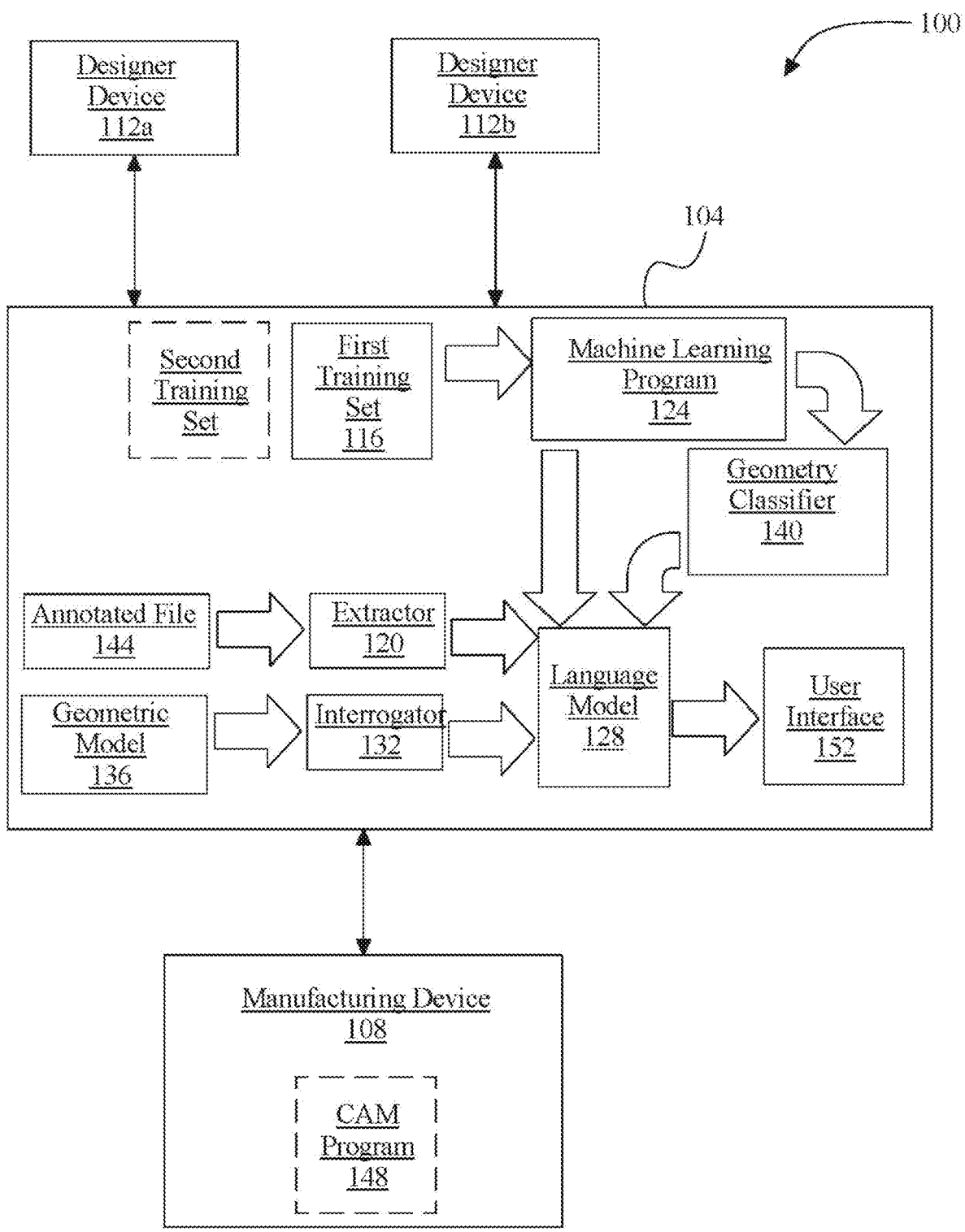
FIG. 1 a block diagram illustrating an exemplary embodiment of a system for generating textual instructions for manufacturers from hybrid textual and image data.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, systems and methods described herein apply mathematical and statistical correlations between words in corpuses of designer files and corresponding textual instructions for manufacturers to derive models stored in memory that can generate textual instructions for manufacturers from textual data submitted with designer files.

Generation of textual instructions for manufacturers can both simulate and improve upon qualitative and/or experience-based selection of such terms by persons, producing a more accurate and less expert-dependent automated manufacturing process.

Systems and methods as described in this disclosure may initiate, perform, or generate instructions to perform one or more manufacturing processes. Manufacturing, as described herein, may be performed according to any manufacturing process or combination of manufacturing processes. Manufacturing process may include an additive manufacturing process. In an embodiment, an additive manufacturing process is a process in which material is added incrementally to a body of material in a series of two or more successive steps. A material may be added in the form of a stack of incremental layers; each layer may represent a cross-section of an object to be formed upon completion of an additive manufacturing process. Each cross-section may, as a non-limiting example be modeled on a computing device as a cross-section of graphical representation of the object to be formed; for instance, a computer aided design (CAD) tool may be used to receive or generate a three-dimensional model of an object to be formed, and a computerized process, such as a "slicer" or similar process, may derive from that model a series of cross-sectional layers that, when deposited during an additive manufacturing process, together will form the object. Steps performed by an additive manufacturing system to deposit each layer may be guided by a computer aided manufacturing (CAM) tool. Persons skilled in the art will be aware of many alternative tools and/or modeling processes that may be used to prepare a design for additive manufacture, including without limitation the production of stereolithography (STL) files and the like. In an embodiment, a series of layers are deposited in a substantially radial form, for instance by adding a succession of coatings to the workpiece. Similarly, a material may be added in volumetric increments other than layers, such as by depositing physical voxels in rectilinear form or other forms. Additive manufacturing, as used in this disclosure, may include manufacturing done at an atomic or nano level. Additive manufacturing may also include manufacturing bodies of material that are produced using hybrids of other types of manufacturing processes; for instance, additive manufacturing may be used to join together two portions of a body of material, where each portion has been manufactured using a distinct manufacturing technique. A non-limiting example may be a forged body of material. an example of a forged body of material may have welded material deposited upon it, which then comprises an additive manufactured body of material.

Deposition of material in an additive manufacturing process may be accomplished by any suitable means, including without limitation any "three-dimensional printing" process. Deposition may be accomplished by stereolithography, in which successive layers of polymer material are deposited and then caused to bind with previous layers using a curing process such as curing using ultraviolet light, for example. Additive manufacturing processes may include fused deposition modeling processes, in which a polymer material is deposited in a molten or otherwise fluid form in successive layers, each of which is cured by natural cooling or other means. Additive manufacturing processes may include processes that deposit successive layers of powder and binder; the powder may include polymer or ceramic powder, and the binder may cause the powder to adhere, fuse, or otherwise join into a layer of material making up the body of material or product. Likewise, additive manufacturing may be accomplished by immersion in a solution that deposits layers of material on a body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Examples of additively manufactured bodies of material include, but are not limited to, plates, slabs, blooms, billets, boards, blocks, among many other shapes, including curvilinear and multisided shapes, and any combination thereof, as set forth in further detail below. As for material(s) composing an additively manufactured body of material, the material(s) may be any suitable material(s), such as metal (solid, sintered, etc.), polymer (solid, foamed, etc.), composite, and multilayer material, or any combination of such materials, among others. Additively manufactured bodies of material may include shapes, such as organic shapes, that have been scanned, for instance and without limitation using LIDAR or similar scanning techniques; scanned shapes may be comprised of primitive shapes, which may be mapped and then additively manufactured. Fundamentally, there is no limitation on the composition of an additively manufactured body of material.

Manufacturing methods may include one or more subtractive processes. As used herein, a subtractive manufacturing process is a process that is performed by removal of material from a workpiece. A subtractive manufacturing process may be any suitable subtractive manufacturing process, such as, but not limited to, rotary-tool milling, electronic discharge machining, ablation, etching, erosion, cutting, and cleaving, among others. Fundamentally, there is no limitation on the type of subtractive manufacturing process(es) that may be used. In an example, differing subtractive manufacturing processes may be used before at different stages or to perform different steps of the subtractive manufacturing process as described below.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In an embodiment, milling equipment used for removing material may be of the computerized numerical control (CNC) type that is automated and operates by precisely programmed commands that control movement of one or more parts of the equipment to effect the material removal. CNC machines, their operation, programming, and relation to CAM tools and CAD tools are well known and need not be described in detail herein for those skilled in the art to understand the scope of the present invention and how to practice it in any of its widely varying forms.

Subtractive manufacturing may be performed using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water-jet or other fluid-jet cutting techniques. Fundamentally, any process for removal of material may be employed for subtractive manufacturing.

Manufacturing processes may include molding processes. As used herein, a molding process may be any process wherein a malleable material, defined as a material that adopts the shape of a cavity into which it is inserted, is inserted into a cavity in an object, known as a "mold," formed to impose a desired shape on material inserted therein. Malleable material may include, without limitation, molten metal or polymer material, fluids curable through heat, chemical reaction, or radiation, froths composed of malleable material with bubbles dispersed therethrough, putty or clay-like malleable solids, and the like. Insertion may be accomplished by pouring, pressing, blowing, injecting, or otherwise introducing malleable material into the cavity of the mold. Malleable material may be cured or otherwise allowed to solidify or become more viscous; this process may be accomplished by allowing materials to cool until they enter a solid or more viscous state, heating to change the chemical nature of materials, curing by irradiation such as ultraviolet radiation, curing by mixture of chemicals to produce a solid or more viscous substance, and the like. Molding processes may include, without limitation, injection molding, blow molding, compression molding, extrusion molding, matrix molding, laminating, or any other molding process.

Manufacturing processes may include one or more processes for the manipulation of sheet material. Sheet material may be any material presented in a sheet of substantially uniform thickness, including without limitation sheets of metal, polymer material such as plastic, and the like. Manipulation of sheets of material may include, without limitation, bending, stretching, cutting, and/or stamping the material. Manipulation may be performed, as a non-limiting example, using one or more cutting or stamping dies.

Manufacturing processes may include finishing and/or coating processes. Finishing and/or coating may be a process in which additive, subtractive, or other methods are used to create a desired surface characteristic or the like in a completed product or component. Finishing and/or coating may include polishing or smoothing processes. Finishing and/or coating may include deposition of material on one or more surfaces of a workpiece, part, or component. Finishing and/or coating may include, without limitation, painting, grinding, dying, laser ablation, laser engraving, polymer coating, plating with metals, abrasive blasting, burnishing, buffing, such as by electroplating, blanching, case-hardening, peening, burnishing, glazing, cladding, conversion coating, knurling, galvanizing, varnishing, plasma-spraying, corona treatment, application of vitreous enamel, thin-film deposition, magnetic field-assisted finishing, or any other suitable treatment for producing a finished surface.

Referring now to FIG. 1, an exemplary embodiment of a system 100 for generating textual instructions for manufacturers from hybrid textual and image data is illustrated. System 100 includes a manufacturing instruction generator 104. Manufacturing instruction generator 104 may be any computing device as described in this disclosure. Manufacturing instruction generator 104 may be any combination of computing devices as described in this disclosure. Manufacturing instruction generator 104 may be connected to a network as described below in connection with FIG. 7; the network may be the Internet. Manufacturing instruction generator 104 may include, for instance, a first server or cluster of servers in a first location and a second server or cluster of servers in a second location. Manufacturing instruction generator 104 may include computing devices that are dedicated to particular tasks; for instance, a single computing device or cluster of computing devices may be dedicated to the operation of queues described below, while a separate computing device or cluster of computing devices may be dedicated to storage and/or production of dynamic data as described in further detail below. Manufacturing instruction generator 104 may include one or more computing devices dedicated to data storage, security, distribution of traffic for load balancing, and the like. Manufacturing instruction generator 104 may distribute one or more computing tasks as described below across a plurality of computing devices of manufacturing instruction generator 104, which may operate in parallel, in series, redundantly, or in any other manner used for distribution of tasks or memory between computing devices. Manufacturing instruction generator 104 may be implemented using a "shared nothing" architecture in which data is cached at the worker; in an embodiment, this may enable scalability of system 100 and/or manufacturing instruction generator 104.

Still referring to FIG. 1, manufacturing instruction generator 104 may be designed and/or configured to perform any method, method step, or sequence of method steps in any embodiment described in this disclosure, in any order and with any degree of repetition. For instance, manufacturing instruction generator 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Manufacturing instruction generator 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
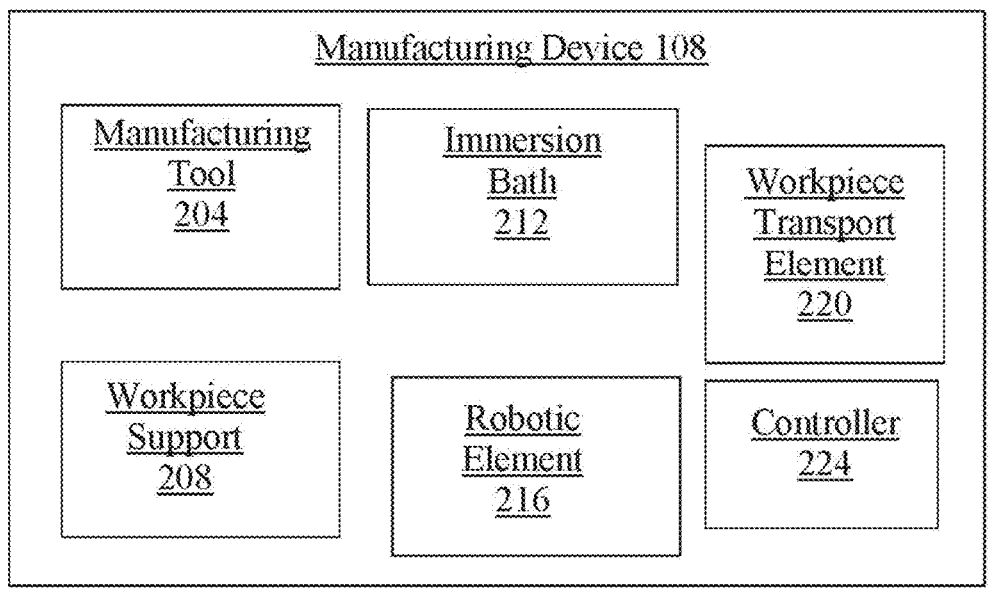
FIG. 2 is a block diagram illustrating an exemplary embodiment of a manufacturing device 108.

With continued reference to FIG. 1, manufacturing instruction generator 104 may communicate with and/or be incorporated in a manufacturing device 108. Referring now to FIG. 2, an exemplary embodiment of a manufacturing device 108 is illustrated. Manufacturing device 108 may include at least a manufacturing tool 204. At least a manufacturing tool 204 may be any device that modifies a workpiece to produce a product. Manufacturing tool 204 may include an applicator or other additive device. For instance, manufacturing tool 204 may include a printer head for a 3D printer. Manufacturing tool 204 may include an extruding device for extruding fluid or paste material, a sprayer or other applicator for bonding material, an applicator for powering, a sintering device such as a laser, or other such material. Manufacturing tool 204 may include a cutting tool. Cutting tool may be a component that removes material from workpiece. In some embodiments, cutting tool includes at least an endmill, which may be a component that removes material when rotated against workpiece. Persons skilled in the art will be aware of many variants of endmill that may be used to remove material from a workpiece. Cutting tool may include a component that transfers motion from a motor (not shown) to at least an endmill; as a non-limiting example, component may be a spindle that rotates and as a result causes endmill to rotate. Manufacturing tool 204 may include a tool changer that can switch a plurality of endmills onto and off of manufacturing tool 204; for instance, tool changer may detach an endmill currently attached to a spindle and attach a different endmill to the same spindle, enabling the automated manufacturing device 108 to use more than one endmill in a single automated manufacturing process. Manufacturing tool 204 108 may include a tool changer that can switch a plurality of endmills onto and off of manufacturing tool 204 108. Manufacturing tool 204 may include a die. Manufacturing tool 204 may include a mold. Manufacturing tool 204 may include one or more nozzles, applicators, or other devices for introducing material to a mold. Manufacturing tool 204 may include a welder or other joining device.

Continuing to view FIG. 2 manufacturing device 108 may include a workpiece support 208. Workpiece support 208 may be a structure that supports a workpiece during the one or more manufacturing steps. Workpiece support 208 may include a base table. Base table may include a surface to which a workpiece or other components may be secured. Surface may be oriented horizontally, vertically, or in any other orientation. Surface may be substantially planar. Base table may include various mechanisms to attach components or workpieces to base table; for instance, base table may include a quick release attachment mechanism that can be used to attach any component having appropriate attachment features such as quick-release studs. Workpiece support 208 may include a fixture, which as used herein is a component used in a manufacturing device 108 to secure a workpiece to the manufacturing device 108 during the one or more manufacturing steps. A fixture may include, without limitation, one or more clamps, fasteners, vices, bolts, studs, quick-release attachment devices, straps, and chucks. A fixture may be one element of a set of fixtures; for instance, a workpiece may be secured in an automated manufacturing system by a plurality of fixtures, such as a plurality of bolts. Workpiece support 208 may include a substrate for initial deposition of material in an additive process.

Still viewing FIG. 2, manufacturing device 108 may include one or more additional elements, such as an immersion bath 212 for stereolithography, EDM, or other processes requiring immersion. Manufacturing device 108 may include one or more robotic elements robotic element 216, including without limitation robot arms for moving, rotating, or otherwise positioning a workpiece, or for positioning a manufacturing tool 204 to work on workpiece. Manufacturing device 108 may include one or more workpiece transport elements 220 for moving a workpiece or finished part or component from one manufacturing stage to another; workpiece transport elements 220 may include conveyors such as screw conveyors or conveyor belts, hoppers, rollers, or other items for moving an object from one place to another.

In some embodiments, and still referring to FIG. 2, manufacturing device 108 may be a mechanical manufacturing device 108. A mechanical manufacturing device 108 as used herein is a manufacturing device 108 that deprives the user of some direct control over the toolpath, defined as movements the manufacturing tool 204 and workpiece make relative to one another during the one or more manufacturing steps. For instance, manufacturing tool 204 may be constrained to move vertically, by a linear slide or similar device, so that the only decision the user may make is to raise or lower the manufacturing tool 204; as a non-limiting example, where manufacturing device 108 is a manually operated machine tool, user may only be able to raise and lower a cutting tool, and have no ability to move the cutting tool horizontally. Similarly, where manufacturing tool 204 is a slide lathe, a blade on the slide lathe may be constrained to follow a particular path. As a further example, base table may be moveable along one or more linear axes; for instance, base table may be constrained to move along a single horizontal axis. In other embodiments, base table is constrained to movement along two horizontal axes that span two dimensions, permitting freedom of movement only in a horizontal plane; for instance, base table may be mounted on two mutually orthogonal linear slides.

Continuing to refer to FIG. 2, mechanical manufacturing device 108 may include one or more components that have movement constrained to rotation. As a non-limiting example, a fixture of a lathe to which a workpiece is attached may be constrained to rotate about an axis, constraining the workpiece to rotate about the axis as well. As a non-limiting example, manufacturing device 108 may include a rotary table. Rotary table may be able to rotate an object, such as a fixture or workpiece, mounted to a work surface of rotary table through an axis of rotation; rotary table may be able to rotate through at least 360 degrees. Objects may be attachable to rotary table using quick-release studs, bolts, or other attachment mechanisms. In some embodiments, base table is a rotary table. In other embodiments, rotary table is mounted on base table. Rotary table may have an axis of rotation parallel to surface of base table. Rotary table may be able to rotate an object mounted to rotary table through an axis perpendicular to a direction of application of manufacturing tool 204. In some embodiments, this enables manufacturing tool 204 to modify a workpiece mounted to rotary table at any exposed point of the workpiece that may be rotated to face manufacturing tool 204. Multiple rotary elements may be combined to enable additional rotational degrees of freedom, for instance using a trunnion table or similar apparatus. Components constrained to rotation and components constrained to linear movement may be combined in various ways. For instance, and without limitation, a trunnion table may be mounted to a base table having x and y-axis linear slides; this may be combined with a z-axis linear slide, for instance bearing the manufacturing tool, resulting in a "five-axis" mechanical manufacturing device 108, such as those sometimes described as five-axis CNC machines. Similarly, a rotational table having an axis in the z direction may be combined with a base table having one or more linear slides and/or a trunnion table or other rotary table.

Still referring to FIG. 2, manufacturing device 108 may include a powered manufacturing device 108. As used herein, a powered manufacturing device 108 is a manufacturing device 108 in which at least one component of the manufacturing device 108 includes at least a component powered by something other than human power. At least a component may be powered by any non-human source, including without limitation electric power generated or stored by any means, heat engines including steam, internal combustion, or diesel engines, wind power, water power, pneumatic power, or hydraulic power. Powered components may include any components of manufacturing device 108. Manufacturing tool 204 may be powered; for instance, manufacturing tool 204 may include an endmill mounted on a spindle rotated by a motor (not shown). Workpiece support 208 may be powered. Where manufacturing device 108 is a mechanical device, motion of components along linear or rotary constraints may be powered; for instance, motion of base table along one or more linear constraints such as linear slides may be driven by a motor or other source of power. Similarly, rotation of rotary table may be driven by a power source. Tool-changer, where present, may be driven by power. In some embodiments, all or substantially all of the components of manufacturing device 108 are powered by something other than human power; for instance, all components may be powered by electrical power.

With continued reference to FIG. 2, manufacturing device 108 may include an automated manufacturing system. In some embodiments, an automated manufacturing system is a manufacturing device 108 including a controller 224 that controls one or more manufacturing steps automatically. Controller 224 may include a sequential control device that produces a sequence of commands without feedback from other components of automated manufacturing system. Controller 224 may include a feedback control device that produces commands triggered or modified by feedback from other components. Controller 224 may perform both sequential and feedback control. In some embodiments, controller 224 includes a mechanical device. In other embodiments, controller 224 includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device. Computing device may include any computing device as described in this disclosure. Computing device may include a computing device embedded in manufacturing device 108; as a non-limiting example, computing device may include a microcontroller 224, which may be housed in a unit that combines the other components of manufacturing device 108. Controller 224 may include a manufacturer client of plurality of manufacturer clients; controller 224 may be communicatively coupled to a manufacturer client of plurality of manufacturer clients.

Still referring to FIG. 2, controller 224 may include a component embedded in manufacturing device 108; as a non-limiting example, controller 224 may include a microcontroller 224, which may be housed in a unit that combines the other components of manufacturing device 108. Further continuing the example, microcontroller 224 may have program memory, which may enable microcontroller 224 to load a program that directs manufacturing device 108 to perform an automated manufacturing process. Similarly, controller 224 may include any other components of a computing device as described in this disclosure in a device housed within manufacturing device 108. In other embodiments, controller 224 includes a computing device that is separate from the rest of the components of manufacturing device 108; for instance, controller 224 may include a personal computer, laptop, or workstation connected to the remainder of manufacturing device 108 by a wired or wireless data connection. In some embodiments, controller 224 includes both a personal computing device where a user may enter instructions to generate a program for turning workpiece into a finished product, and an embedded device that receives the program from the personal computing device and executes the program. Persons skilled in the art will be aware of various ways that a controller 224, which may include one or more computing devices, may be connected to or incorporated in an automated manufacturing system as described above.

Continuing to refer to FIG. 2, controller 224 may control components of automated manufacturing system; for instance, controller 224 may control elements including without limitation tool changer to switch endmills, spindle or gear systems operatively coupled to spindle to regulate spindle rotational speed, linear movement of manufacturing tool 204, base table, or both, and rotation or rotational position of rotary table. As an example, in embodiments involving subtractive manufacturing, the equipment used for removing material may be of the computerized numerical control (CNC) type that is automated and operates by precisely programmed commands that control movement of one or more parts of the equipment to effect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms. Similarly, controller 224 may coordinate deposition and/or curing of material in additive manufacturing processes, where manufacturing device 108 is an additive manufacturing device 108. Persons skilled in the art, upon reading the entirety of this disclosure, will be aware of similar automated control systems usable for various forms of manufacturing.

Referring again to FIG. 1, manufacturing instruction generator 104 may communicate with one or more designer devices 112a-b. One or more designer devices 112a-b may be devices operated by users designing articles of manufacture. One or more designer devices 112a-b may include any device or devices suitable for use a manufacturing instruction generator 104. Users may design articles of manufacture using one or more computer-aided design (CAD) programs, or other computer modeling programs permitting the creation of two or three-dimensional models depicting one or more views of an article to be manufactured. One or more CAD or other computer modeling programs may operate on designer devices 112a-b and/or on other devices from which designer devices 112a-b may receive models. One or more designer devices 112a-b may include at least a document-producing program such as a word processor, image manipulation program or portable document format (PDF) program; at least a document-producing program may be usable to produce a document containing a combination of images, such as views of models of products to be manufactured, with text including instructions by users of designer devices 112a-b and/or other users indicating a manner in which such users wish for manufacture of the products to be manufactured to be performed.

Continuing to view FIG. 1, system 100 may include an extractor 120 operating on manufacturing instruction generator 104. Extractor 120 may be implemented as a hardware or software module or program, for instance and without limitation by programming manufacturing instruction generator 104 to instantiate the extractor 120 using one or more computer control instructions and/or programming language instructions. Extractor 120 may function to extract one or more words from at least an annotated file as described in further detail below in reference to FIG. 4.

With continued reference to FIG. 1, system 100 may include a machine learning program 124 operating on manufacturing instruction generator 104. Machine learning program 124 may be implemented as a hardware or software module or program, for instance and without limitation by programming manufacturing instruction generator 104 to instantiate the machine learning program 124 using one or more computer control instructions and/or programming language instructions. A machine learning process, as used in this disclosure, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 1, training data, as used herein, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and continuing to refer to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by manufacturing instruction generator 104 may correlate any input data as described in this disclosure to any output data as described in this disclosure. As a non-limiting illustrative example, inputs may include one or more words extracted from annotated files, and outputs may include textual instructions for manufacturers, as described in further detail below.

Still referring to FIG. 1, machine learning program 124 may operate to produce a language model 128. Language model 128 may be a program automatically generated by manufacturing instruction generator 104 and/or machine learning program 124 to produce associations between one or more words extracted from at least a training annotated file and one or more textual instructions for manufacturers to manufacture a product. One or more textual instructions for manufacturers may include, without limitation, instructions describing one or more materials to be used in manufacture of a product; for instance, a particular metal such as highly machinable aluminum, tungsten carbide, or steel, a particular polymeric material or plastic, a ceramic, or the like may be specified, as dictated by considerations of cost, strength, ease and/or rapidity of manufacture, or the like. One or more textual instructions for manufacturers may indicate a property of material, such as hardness, ductility, machinability, resistance to heat, vibration, or the like, electrical properties, magnetic properties, density, mass, weight, or any other material property that may occur to persons skilled in the art upon reviewing the entirety of this disclosure. One or more textual instructions for manufacturers may indicate one or more desired tolerances according to which manufacture should proceed. One or more textual instructions for manufacturers may indicate one or more finishes for a product to be manufactured. One or more textual instructions for manufacturers may indicate one or more inserts to be added to a product to be manufactured. One or more textual instructions for manufacturers may indicate one or more bends to be, for instance, made in a sheet metal product. One or more textual instructions for manufacturers may indicate desired threading of one or more holes or on one or more projections of a product. The above examples are not intended to be exhaustive; persons skilled in the art, upon reviewing the entirety of this disclosure, will be aware of various other examples of textual instructions for manufacturers that may be used consistently with the above description. One or more textual instructions for manufacturers may be in textual form, represented by words or numbers. One or more textual instructions for manufacturers may be stored in data structures that label the one or more textual instructions for manufacturers as distinct from the one or more words extracted from annotated files as described above; the one or more words may similarly be labeled to distinguish the one or more words from the one or more textual instructions for manufacturers.

Still referring to FIG. 1, associations between one or more words and one or more textual instructions for manufacturers may include, without limitation, mathematical associations, including without limitation statistical correlations between each word of one or more words and at least one manufacturing instruction of one or more textual instructions for manufacturers. Statistical correlations and/or mathematical associations may include probabilistic formulas or relationships indicating, for instance, a likelihood that a given word indicates a given manufacturing instruction. One or more associations may include one or more geometric relationships, including distance between vectors in a vector space representing relationships between words and textual instructions for manufacturers as described in further detail below in reference to FIG. 4.

Machine learning program 124 and/or manufacturing instruction generator 104 may generate the language model 128 by any suitable method, including without limitation a natural language processing classification algorithm; language model 128 may include a natural language process classification model that enumerates and/or derives statistical relationships between input terms, such as one or more words, and output terms, such as one or more textual instructions for manufacturers. Machine-learning processes may include classification algorithms, defined as processes whereby a computing device derives, from training data, a model known as a "classifier" for sorting inputs into categories or bins of data. Classification may be performed using, without limitation, linear classifiers such as without limitation logistic regression and/or naive Bayes classifiers, nearest neighbor classifiers, support vector machines, decision trees, boosted trees, random forest classifiers, and/or neural network-based classifiers. Algorithm to generate language model 128 may include a stochastic gradient descent algorithm, which may include a method that iteratively optimizes an objective function, such as an objective function representing a statistical estimation of relationships between terms, including relationships between input terms and output terms, in the form of a sum of relationships to be estimated. Objective function may be of the form:

$$Q(w) = \frac{1}{n}\sum_{i=1}^{n} Q_i(w)$$

by minimizing, at a point win training data, a function of gradient $\nabla Q_i$ at an exemplary sample $Q_i$ of the objective function evaluated at values of w, which may be accomplished by iteratively sweeping through training data and minimizing, for each training example in the training data, the expression $w-\eta\nabla Q_i$. Selection of parameter w to minimize error may be used to indicate relationships between input data; for instance, when parameter set w has been determined to minimize the above error function, w may be used as a coefficient or other characterizing element of a mathematical relationship relating inputs to outputs, where inputs are, e.g., one or more words extracted from an annotated file as described above, and outputs may be textual instructions for manufacturers, resulting in a classifier that may be used to output one or more most probable textual instructions for manufacturers when input one or more words extracted from an annotated file.

In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include a manufacturing instruction or property that takes on a discrete state, such as without limitation a material to be used for manufacture. There may be a finite number of materials that can be used for a given manufacturing process. An HMM inference algorithm, such as the forward-backward algorithm or the Viterbi algorithm, may be used to estimate the most likely discrete state (e.g., material) given a sequence of words. Machine-learning program may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked recommendations on values for material derived from the tokenized text of a print and/or annotated file.

Still referring to FIG. 1, language model 128 may include a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique word of one or more words may be represented by a vector of the vector space. Each manufacturing instruction of the one or more textual instructions for manufacturers may be represented by a vector of the vector space. In an embodiment, each unique word and/or manufacturing instruction of one or more words and/or one or more textual instructions for manufacturers may be represented by a dimension of vector space; as a non-limiting example, each element of a vector and/or manufacturing instruction may include a number representing an enumeration of co-occurrences of the word and/or manufacturing instruction represented by the vector with another word and/or manufacturing instruction. Vectors may be normalized, scaled according to relative frequencies of appearance and/or file sizes. In an embodiment associating each word with a manufacturing instruction may include computing a degree of vector similarity between a vector representing each word and a vector representing the manufacturing instruction; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, system 100 and/or manufacturing instruction generator 104 may be designed and configured to modify language model using one or more geometric models received with and/or associated with an annotated file. Drawings describing a part and its manufacturing specification may be accompanied by three-dimensional data describing geometry of the part or assembly. This three-dimensional data may be designed in CAD software and may be provided in a CAD file format or uploaded to or created in a cloud-based three-dimensional platform. Such geometry may be used to provide additional context about the text and image data in the drawing. This geometric context may be used to supplement models trained using the techniques described above.

Still referring to FIG. 1, manufacturing instruction generator 104 may include an interrogator 132, which may be designed and configured to analyze a geometric model 136 of a part, such as without limitation a model provided in a CAD file or the like as described above. In some embodiments, by way of a non-limiting example, interrogator 132 may parse and/or analyze a CAD model to identify separate elements thereof by reading a combination of (a) specific commands issued by a CAD system and (b) specific routines or functions associated with such commands to determine whether they collectively define an individual element or portion (a "shape," "solid body," or "component") of a CAD model. Many CAD systems, including, by way of example, the SOLIDWORKS® CAD system (registered trademark of Dassault Systemes), include an application program interface (API) to enable a user to control the issuance of customized routines or functions associated with such commands. Interrogator 132 may read such commands, routines, and functions to determine whether they define an individual shape. As a further non-limiting example, three-dimensional and/or geometric data may be provided in a standard format, such as STEP, defined by the IS010303-21 standard, in which the geometry is described as a collection of shapes defined by a shape type and set of parameters. Interrogator 132 may analyze various geometric aspects of the defined shape to determine whether such aspects correspond to one or more manufacturing requirements for a product to be manufactured based on a CAD model. If so, such requirements may be output from interrogator 132 as CAD data, interrogation data, and/or objective requirements data for processing and analysis by any one or more components of the present disclosure.

As a nonlimiting example, and continuing to refer to FIG. 1, interrogator 132 may identify discrete shapes in a CAD model. In an embodiment based on the SOLIDWORKS® CAD system, described herein for illustrative purposes only, interrogator 132 may read the "FeatureManager Design Tree" (an outline representation of individual shapes) to determine the number of solid bodies (or shapes) in the design. Representations of individual shapes may be found in other CAD software files, and other CAD software systems may be used. As a non-limiting example, in a SOLIDWORKS® CAD system, one command usable to analyze the number of solid bodies may be:

object[ ] bodies=(object[ ])part.GetBodies2((int)Const. swBodyType_e.swSolidBody, false);

and the output may be a list of bodies. The foregoing code statement is listed by way of example only; other code statements or sequences could be used. Interrogator 132 may then analyze geometric aspects of such identified shapes and compare such aspects to corresponding manufacturing requirements. In an embodiment, these manufacturing requirements may include given starting materials. In other words, interrogator 132 may determine whether a given defined shape can be manufactured from a given starting material based on one or more analyzed geometric properties of one or more identified shapes. If so, that starting material may be identified as a manufacturing option or requirement and may be included in CAD data generated by interrogator 132.

In an embodiment, and as a non-limiting example and still referring to FIG. 1, interrogator 132 may determine whether a defined shape may be manufactured from a sheet metal part. In general, in order to be manufactured from sheet metal, a defined shape must have a uniform thickness. As will be apparent to a person of skill in the art after reading this disclosure in its entirety, other geometric attributes may be analyzed to determine potential manufacturing requirements. By way of example, a given angle of bend may preclude use of certain starting materials. A given dimensional measurement may preclude certain starting materials. In some embodiments, different geometric properties may be compared in combination to define manufacturing requirements. For example, a given shape may have a uniform thickness (such that it could be manufactured from two different types of sheet metal, such as copper or aluminum), be 0.50 inch thick, and include bends of over 45° (which may preclude the use of a copper sheet, because various types of copper, depending, on composition, may not be bendable at 45° at a 0.50 inch thickness).

In some embodiments, and with continued reference to FIG. 1, in order to determine whether a given shape has a uniform thickness, interrogator 132 may first execute the "GetBoundingBox" SOLIDWORKS® CAD system's API command. The resulting output may be an array of X, Y and Z extents, for example:

XCorner1, YCorner1, ZCorner1
    XCorner2, YCorner2, ZCorner2

In some embodiments, and still referring to FIG. 1, a part may not be oriented so that its thickness is represented by the Z dimension (i.e., the part is lying flat) but instead by a X or Y dimension. This may be the case where an interrogator 132 needs to determine whether sheet metal can be used to fabricate the part. However, if interrogator 132 analyzes the x,y plane, then it may not be able to reliably identify each portion of the part that can be fabricated from sheet metal; by also analyzing the z dimension, the interrogator 132 may reliably identify all sheet metal parts.

Continuing to refer to FIG. 1, interrogator 132 may determine which dimension represents thickness by determining distance between corners. Thickness may be represented, as a non-limiting example, by the shortest distance between vertices. Given these calculations, interrogator 132 may determine that a workpiece has a uniform thickness if all of the following statements are true: the CAD model must have at least one solid body; all of the vertexes of the solid body faces that are perpendicular to the base plane are also equal to the thickness value (Variable X in this example); no vertex edge length is less than the thickness value; and the perimeter of the top face is equal to the perimeter of the bottom face.

As such, and with continued reference to FIG. 1, interrogator 132 may conclude that the analyzed shape may be fabricated from a single sheet metal part. Accordingly, by way of example, "sheet metal" may be included in CAD data as a manufacturing option or requirement. The "uniform thickness" determination set forth above, as well as the attendant height, length, and thickness measurements, among others, may be used to enable other comparisons between manufacturing requirements and supplier attributes. For example, once the use of a sheet metal workpiece has been confirmed as set forth above, a capabilities and/or willingness engine, such as willingness engine 206, may query stored supplier data for any one or more of length, width, thickness, or any other supplier constraints for sheet metal parts. An example of a potential supplier constraint that would be determined by the nature of the starting workpiece material is as follows. For mechanical hole punching for sheet metal parts, a press brake may form predetermined bends in a workpiece by clamping it between a matching punch and a die. A press brake may include a bed for supporting the workpiece between the punch and the die. However, press brakes cannot typically bend parts longer than the length of the bed. If a given supplier uses a press brake having a maximum bed length of eight feet, utilizing the process as set forth above, interrogator 132 may determine that a defined shape of a CAD model has a length of ten feet.

In general, and still referring to FIG. 1, where a design represented in a geometric model 136 does not specify materials to use or not to use in making design, interrogator 132 may determine from other factors in design which materials are usable or not usable to make design. As a non-limiting example, design may specify one or more manufacturing methods that may be used to manufacture part; interrogator 132 may eliminate materials for creating design by determining that the eliminated materials are incompatible with the one or more manufacturing methods. As an example, where design specifies a category of CNC milling that cannot machine tungsten carbide, interrogator 132 may eliminate tungsten carbide as a possible material. Design may have a form that limits the manufacturing process that may produce design; for instance, a design may include an enclosed internal cavity or void, eliminating CNC machining as a process for manufacturing design. Design may specify at least a physical attribute of part, such as density, hardness, tensile strength, heat resistance, or the like; interrogator 132 may select potential materials for part based on the at least a physical attribute. Design may similarly specify how quickly simulations should be generated. Interrogator 132 may determine a manufacturing process as a function of physical attributes and/or included or excluded material.

Still referring to FIG. 1, those skilled in the art are aware of techniques to analyze the manufacturability of a geometry for a particular manufacturing process (for example: CNC milling, CNC lathe, sheet metal fabrication, laser cutting, waterjet cutting, wire EDM, injection molding, urethane casting, metal casting, 3D printing, etc., or some combination of one or more of those processes). Automated manufacturability analysis could produce findings in the form of a report or a data file describing overall whether the part can be manufactured using that process as well as feedback on specific locations or features of the part that would be either impossible, time-consuming, expensive, or otherwise difficult to manufacture on that process. Those skilled in the art will also be aware of automated tools capable of identifying in a 3D geometry specific features applicable to some manufacturing process. In CNC milling, these features may include pockets, chamfers, holes, bevels, and so on. In sheet metal fabrication, these features may include bends, bend reliefs, drilled holes, laser cut lines, welds, and so on. To provide additional context to text and image analysis, a 3D geometry is analyzed for manufacturability feedback and for feature detection across a plurality of manufacturing processes. Based on manufacturability feedback, simple criteria are applied to determine whether the part is a candidate for that particular process. For candidate processes, those detected features are then considered applicable to the geometry.

With continued reference to FIG. 1, a set of processes and features applicable to a geometry may be used to adjust the likelihood of certain text and image data indicating certain manufacturing instructions. Based on compatible processes, different words or tokens may be weighted differently. Heuristics can be applied to inference technique. In one embodiment, compatibility with sheet metal would increase the likelihood that tokens corresponding to bendable material are in fact indicative of an instruction to use that certain material. In another embodiment, the presence of hole features are used to increase the likelihood that a token represents a tolerance of a hole diameter or depth. Similarly, a token that contains the specification of a screw threading is considered more likely to be a manufacturing instruction for hold threading if a drilled hole of the same size is detected in the geometry. In yet another embodiment, the presence of tokens related to masking may be interpreted as a manufacturing instruction for masking of a plating or other finishing technique if the geometry contains holes or certain configurations of planes that are often masked during metal finishing. When a surfaced area requiring end mill work (for example, a curved plane not aligned with the part's primary axes), a token in a certain format may be considered more likely to indicate a manufacturing instruction for a surface finish tolerance.

As a non-limiting example, and still referring to FIG. 1, manufacturing instruction generator 104 may be configured to generate a geometry classifier 140 using training data that correlates textual manufacturing instructions to interrogator 132 outputs and/or elements of data that could be produced by an interrogator 132, including without limitation geometric features of a part to be manufactured, materials to be used and/or suitable for use in manufacturing the part, processes to be used and/or suitable for use in manufacturing the part, equipment and/or manufacturing devices as described in this disclosure that are to be used and/or are suitable for use in manufacturing the part, and the like. Geometry classifier 140 may output one or more textual instructions for manufacturers that are applicable to such inputs. Output may alternatively or additionally include probability of a given textual instruction for a manufacturer being associated with a given geometric model 136; for instance, an output may indicate that an instruction describing bend may be highly probable for a geometric model 136 manufacturable using sheet-metal processes, while such an instruction may be output as highly improbable for a design that is not manufacturable using sheet metal processes.

Training data for geometry classifier 140 may be populated by receiving a plurality of geometric model 136*s* and/or interrogator 132 outputs therefrom and a plurality of correlated textual instructions for manufacturers, which may be input by users and/or recorded on system 100 from past iterations of methods as described herein. Manufacturing instruction generator 104 may be configured to generate geometry using a classification algorithm, which may be implemented, without limitation, using any classification algorithm suitable for language model 128 as described above. As a non-limiting example, manufacturing instruction generator 104 may use a K-nearest neighbors algorithm that may be configured to classify an input vector including a plurality of interrogator 132 outputs to textual manufacturing instructions or the like.

In an embodiment, geometry classifier 140 and/or other heuristic and/or determination of likelihood that a given textual manufacturing instruction is suitable for and/or associated with a given geometric model 136 and/or element thereof may be used to modify output of language model.

For instance, and without limitation, where output of language model includes a plurality of possible textual manufacturing instructions, output may be filtered by eliminating textual manufacturing instructions that are not in output of geometry classifier 140 or other such process; plurality of possible textual manufacturing instructions may alternatively or additionally have probabilities, as determined by language model 128, of correctness of each textual instruction for manufacturers weighted by or modified according to probability that each textual instruction for manufacturers is associated with a geometric model 136 associated with an input annotated file. Alternatively, training data useable to train geometry classifier 140 may be combined with training data for language model, and, for instance, language model may classify combinations of words extracted from annotated files with interrogator 132 outputs and/or elements of geometric model 136s to textual instructions for manufacturers using any classification process described above.

Alternatively or additionally, and with continued reference to FIG. 1, computing device 104 may be configured to generate one or more textual instructions not included in annotated file and/or geometric model 136, by identifying a process template associated with annotated file and/or geometric model 136, where the process template is included and/or is associated with the one or more textual instructions. A "process template," as used in this disclosure is a data structure listing operations and/or instructions used by a manufacturer to produce a part using a particular manufacturing process. As a non-limiting example, a sheet metal process template may include instruction and/or operations of and/or pertaining to CAM programming, sheet procurement and/or preparation, laser cutting, forming (including, without limitation bending, stamping, or the like), deburring, quality assurance, packaging, and/or shipping. Templates may be stored in memory of computing device and/or received from users, remote devices, or the like. Where information from a drawing and/or geometry file implies a certain subset of operations matching and/or contained in a specific process template, computing device 104 may determine that all operations and/or instructions from template may also apply to manufacture of a part depicted therein; computing device may alternatively or additionally use a k-nearest neighbors or other classification process to find a process template most closely matching a set of interrogator outputs and/or words as described above, determine the best matching process template, extract additional textual instructions for manufacturers and/or other instructions from the matching template, and use such instructions as textual instructions for manufacturers and/or to implement one or more manufacturing steps. Instructions of process template, such as matching process template, may include at least an instruction for a manufacturing device and/or at least a textual instruction for manufacturer that is not included in interrogator outputs and/or one or more words extracted from annotated file. This may be used, without limitation, to generate additional instructions, which may be combined with textual instructions for manufacturers as generated by language model and/or geometry classifier 140. A manufacturing process template associated with interrogator outputs, words extracted from annotated file, and/or textual instructions for manufacturers may be identified, without limitation, using a heuristic and/or machine learning model such as a classifier as described above, that classifies interrogator outputs, words extracted from annotated file, and/or textual instructions for manufacturers to manufacturing process templates; classifier may be trained using training data that includes interrogator outputs, words extracted from annotated file, and/or textual instructions for manufacturers and correlated manufacturing process templates, where training data may be created from user inputs of templates associated with interrogator outputs, words extracted from annotated file, and/or textual instructions for manufacturers and/or from templates used in past manufacturing operations in which annotated files and/or geometric models from which interrogator outputs, words extracted from annotated file, and/or textual instructions for manufacturers may be extracted were also used. Heuristic and/or model may generate a single manufacturing process template representing a probabilistic best match for interrogator outputs, words extracted from annotated file, and/or textual instructions for manufacturers and/or may generate two or more most probable matches for interrogator outputs, words extracted from annotated file, and/or textual instructions for manufacturers; additional textual instructions for manufacturers included in and/or linked to one or more most probable manufacturing process templates may be included in a collection of textual instructions for manufacturers, and/or a collection of candidate textual instructions for manufacturers that may be narrowed and/or filtered using language model, geometry classifier, or any other process and/or component described herein. As an illustrative, non-limiting example, a process template may be used to infer a laser cutting instruction from drawing and 3D model describing a part compatible with a sheet metal forming process, even if the drawing or 3D model did not contain any specific keywords or data related to laser cutting. In an embodiment, a pre-determined template for a given manufacturing operation may utilize prior knowledge that a give step typically precedes or follows a particular other step in a manufacturing process. For instance, and for the purposes of illustration only, a process template for a sheet metal operation may utilize prior knowledge that a laser cutting operation commonly precedes a sheet metal forming operation, and therefore, a geometry compatible with or drawing explicitly calling for sheet metal manufacturing techniques is likely to require laser cutting. Persons skilled in the art, upon reviewing the entirety of this disclosure, will be aware of various alternative or additional examples that may be contemplated within the scope of this disclosure.

As noted above, and still referring to FIG. 1, manufacturing instruction generator 104 may be configured to perform any process iteratively and/or in parallel; for instance, manufacturing instruction generator 104 may be configured to generate a manufacturer-specific language model, which may be generated using any process and/or components suitable for generation of language model 128 as described above, using training data restricted to annotated files and/or geometric model 136s and/or interrogator 132 outputs and associated textual manufacturer instructions that have been used by a particular manufacturer and/or group of manufacturers in past manufacturing processes and/or have been provided by such particular manufacturer and/or group of manufacturers as representing combinations usable by such manufacturer and/or group thereof. Group of manufacturers may include a group of manufacturers that perform similar processes to each other, such as manufacturers that perform machining as opposed to additive manufacturers, a group of manufacturers in a particular geographic region, a group of manufacturers that speak a particular language, or the like. Group of manufacturers may include combinations and/or intersections of such groups; for instance, group of manufacturers may include all sheet-metal manufacturers in particular city, all machine-shops that speak Mandarin, or the like.

Manufacturing instruction generator 104 may be configured to generate a designer-specific language model, which may be generated using any process and/or components suitable for generation of language model 128 as described above, using training data restricted to annotated files and/or geometric model 136s and/or interrogator 132 outputs and associated textual manufacturer instructions that have been used by a particular designer and/or group of designers in past manufacturing processes and/or have been provided by such particular designer and/or group of designers as representing combinations usable by such designer and/or group thereof. Group of designers may include a group of designers that request similar processes to each other, such as manufacturers that request machining, a group of designers in a particular geographic region, a group of designers that speak a particular language, or the like. Group of designers may include combinations and/or intersections of such groups.

Still referring to FIG. 1, designer-specific language models and/or manufacturer-specific language models may be created by first generating a generalized language model 128 from training data including manufacturers and/or designers belonging to multiple groups and/or all groups, and/or a generalized training set including all inputs and outputs suitable for training set as collected by system 100, and then performing further training, for instance using additional iterations of any process as described above, using manufacturer-specific and/or designer-specific training data as described above. Designer-specific language models and/or manufacturer-specific language models may be combined to produce outputs in any suitable way. For instance, and without limitation, such models may be run in parallel, for instance by providing designer-specific outputs for a given designer and manufacturer-specific outputs for a given manufacturer, and then averaging and/or combining outputs. Alternatively or additionally, outputs from designer-specific language model may be used as inputs to a manufacturer-specific model, which may, for instance cluster textual manufacturer instructions used by other manufacturers to those used by a given manufacturer and/or group of manufacturers that has or have been selected to perform a manufacturing process. An annotated file 144 may be processed according to methods as described herein using language model 128 and/or geometry classifier 140 to generate textual instructions for manufacturers.

Continuing to refer to FIG. 1, system 100 may include a CAM program 148 operating on manufacturing instruction generator 104, manufacturing device 108, and/or an additional device. CAM program 148 may include a program that generates machine control instructions from one or more models and/or textual instructions for manufacturers; machine control instructions as defined herein are instructions that direct an automated manufacturing device 108 and/or a controller 224 of such a device to perform one or more physical manufacturing operations such as moving a manufacturing tool to a prescribed spot, depositing or removing material according in a particular geometric form as mathematically identified, or the like. Machine control instructions may include, for instance, CNC operation instructions, instructions directing a printer head of an additive manufacturing device 108, or the like. In an embodiment CAM program 148 takes one or more textual instructions for manufacturers output by language model 128 as inputs and generates and/or modifies machine control instructions based on textual instructions for manufacturers.

Figure 3:
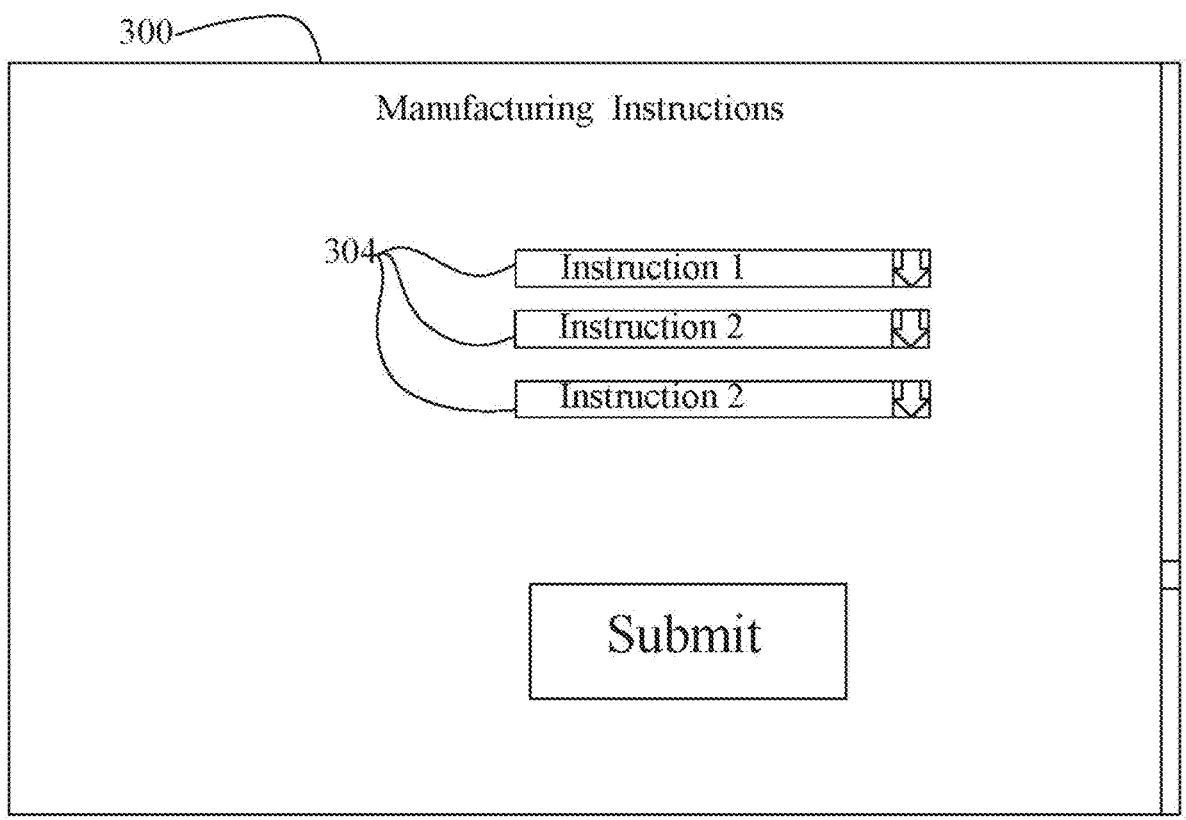
FIG. 3 is schematic diagram of an exemplary embodiment of a user interface 152 140 display.

Continuing to view FIG. 1, system 100 may include a user interface 152 140; user interface 152 140 may display on designer devices 112a-b and/or on other devices operating by users evaluating one or more textual instructions for manufacturers as output by language model 128 according to processes described in further detail below. User interface 152 140 may include a program that operates on manufacturing instruction generator 104, and remotely configures designer devices 112a-b and/or other user devices to display one or more data in a given format, for instance by transmitting instructions to a browser, native application, or other program operating on designer devices 112a-b and/or other user devices. Referring now to FIG. 3, an exemplary embodiment of a UI display 300 generated by user interface 152 140 is illustrated. UI display 300 may include at least a category option display element 304; at least a category option display element 304 may include any display element permitting a user to view a plurality of textual instructions for manufacturers belonging to a give category and/or to select one manufacturing instruction from such a plurality. At least a category option display element 304 may include a set of radio buttons, a drop-down list, a set of selectable links, or the like. At least a category option display element 304 may display a selected option and/or default option; for instance, where a process as described below has produced an output selecting a manufacturing instruction from a plurality of such instructions pertaining to a given category, at least a category option display element 304 may display that selection and/or an indication differentiating the selected option from non-selected options. At least a category option display element 304 may be configured to receive a user command switching from one option to another, including using text input, selection of another element of a drop-down list, another radio button, another link, or the like. Categories according to which textual instructions for manufacturers are organized may include, without limitation, material types, material properties, manufacturing methods, tolerances, threading, bends, locations of bends, or any other grouping of textual instructions for manufacturers that may occur to a person skilled in the art upon reviewing the entirety of this disclosure. UI display 300 may include one or more additional features such as buttons, links, text boxes, and the like.

Referring now to FIG. 4, an exemplary embodiment method 400 of generating textual instructions for manufacturers from hybrid textual and image data is illustrated. At step 405, manufacturing instruction generator 104 generates at least a language model from a dataset including a plurality of textual data extracted from annotated files describing products to manufacture and a plurality of correlated textual instructions for manufacturers. At least a language model 128 receives textual data as inputs and produces textual instructions for manufacturers as outputs.

Manufacturing instruction generator 104 may receive a first training set 116. Receiving first training set 116 may include, without limitation, receiving first training set 116 from a remote device over a network, receiving first training set 116 from one or more designer devices 112a-b, receiving first training set 116 from a device operated by a manufacturer, and/or receiving first training set 116 from a local and/or portable memory device. For instance, a manufacturer and/or designer may provide a training set representing past manufacturing processes and related annotated files, as described in further detail below. Alternatively or additionally, manufacturing instruction generator 104 may receiving first training set 116 piecemeal, for instance by receiving annotated files related to particular manufacturing processes, and sets of textual instructions for manufacturers related to same particular manufacturing processes, at the time of manufacture; in an embodiment, manufacturing instruction generator 104 may generate textual instructions for manufacturers, for instance and without limitation according to one or more embodiments of method 400, and add such instructions to a training set including annotated files from which they were generated, and/or adding modified instructions based on user feedback as described in further detail below.

Still referring to FIG. 4, first training set 116 may include at least a training annotated file describing at least a first product to manufacture. At least a training annotated file may contain one or more textual data. Textual data, as used herein, include any data represented using alphanumeric characters, characters from any writing system, mathematical symbols, engineering symbols, punctuation, diacritic marks, geometric dimensioning and tolerancing (GD&T) symbols, chemical symbols and formulas, spaces, whitespace, and other symbols and the like. At least a training annotated file may include such text as labels, which may be typed, added in image form, handwritten, or entered in any other suitable way. In an embodiment, at least a training annotated file may include at least a file containing a combination of text and images; for instance images may depict one or more views of at least a product to be manufactured and/or one or more precursor stages to the completed at least a product, and textual data may include legends accompanying the images, labels indicating or displayed on particular features of the images, or the like. As a non-limiting example, where at least a product is a sheet metal product, images may be of a flat piece of sheet metal, which may be cut to a prescribed shape, with textual data such as labels indicating locations of bends to be applied to convert the flat piece of sheet metal into the at least a product. Persons skilled in the art, upon reviewing the entirety of this disclosure, will be aware of various ways in which textual data may be associated with images depicting at least a product to be manufactured. At least a training annotated file may include a plurality of annotated files, such as without limitation files depicting different views of at least a first product and/or different stages in manufacture of at least a first product.

Continuing to refer to FIG. 4, at least an annotated file may include one or more title blocks. A title block, as used herein, is a section of a page on an engineering drawing or other annotated file which contains metadata such as date, title, author, company, part number(s) and the like. Title blocks may also include information about material and general manufacturing approaches A title may be located in one corner of a print and/or page of an annotate file; title blocks; title blocks may appear at other locations as well. Title blocks may include grid lines to separate types of metadata. Persons skilled in the art, upon reviewing the entirety of this disclosure, will be aware of various forms of title blocks as consistent with the above description.

In an embodiment, annotated files may be used when quoting and/or describing large and complicated manufacturing jobs, across many different types of processes including without limitation CNC machining work; annotated files may be provided in the form of one or many "prints" associated with the 3D CAD model that a buyer and/or designer may send to a supplier and/or manufacturer. A print or annotated file may take the form of a portable document file (pdf) document that encloses important information such as without limitation the desired material and finish of the part, as well as denoting any features of the part that may require special tolerances or additional attention, like any threading operations.

Continuing to refer to FIG. 4, first training set 116 includes at least an instruction set containing one or more textual instructions for manufacturers to manufacture the at least a first product; one or more textual instructions for manufacturers may include any textual instructions for manufacturers as described above. In an embodiment, each instruction of one or more textual instructions for manufacturers may be linked in first training set 116 to one or more annotated files of at least a training annotated file to which the one or more textual instructions for manufacturers are related. For instance, and without limitation, one or more annotated files of at least a training annotated file may have been used as a designer description of a desired manufacturing process, and one or more related or linked textual instructions for manufacturers may include textual instructions for manufacturers that were actually used to perform that desired manufacturing process and/or were generated by system 100, one or more users, or another automated process based on the one or more files and/or additional instructions from a designer and/or a manufacturer. In an embodiment, first training set 116 may make up one or more "truth" datasets provided by manufacturers from various places, from across a geographical region such as the United States, and/or from around the world to learn what words found in a manufacturing print point to which values for a suite of variables we are attempting to extract. For instance, with regard to manufacturing materials, a "truth" dataset may include a collection of thousands of manufacturing prints that have an associated material (Aluminum 6061-T6, Stainless Steel 304-2B, etc.) denoted somewhere on the page, combined with textual instructions for manufacturers describing the materials. Dataset may include data from hundreds of different customers and dozens of manufacturing shops around the United States and/or other regions.

Still referring to FIG. 4, manufacturing instruction generator 104 may extract one or more words from at least a training annotated file. One or more words may include, without limitation, strings of one or characters, including without limitation any sequence or sequences of letters, numbers, punctuation, diacritic marks, engineering symbols, geometric dimensioning and tolerancing. (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Continuing to refer to FIG. 4, extraction may be performed by extractor 120. Extractor 120 and/or manufacturing instruction generator 104 may perform optical character recognition (OCR) to convert handwritten textual data into digital character data. Extractor 120 and/or manufacturing instruction generator 104 may extract one or more words using a tokenization procedure, dividing detected textual data into discrete tokens, for instance by detecting spaces, punctuation, and/or other divisions associated with boundaries of individual words. Tokens may be modified to be of uniform case, such as all lower case; alternatively or additionally, subsequent processes as described herein may be performed in a case-insensitive manner. One or more words may include at least a phrase; a phrase may be extracted, without limitation, by comparing a sequence of tokens and/or individual words, characters and/or symbols appearing in sequence to a dictionary of phrases, by enumerating a number of occurrences of a particular sequence of tokens, words, characters, and/or symbols in a corpus of documents and/or annotated files, including without limitation at least a training annotated file, and comparing enumeration to an absolute or relative frequency-based threshold to determine whether it should be recorded as a phrase or discarded, and/or any other suitable process for extracting phrases from text that may occur to persons skilled in the art upon reviewing the entirety of this disclosure. One or more words may include at least a textual symbol, which may be a standalone character, special character, and/or character sequence having meaning relating to manufacture, engineering, or the like.

Still referring to FIG. 4, manufacturing instruction generator 104 may generate a language model 128 associating each word of the one or more words with an instruction of the one or more textual instructions for manufacturers. This may, in a non-limiting example, be performed by machine learning program 124; this may be performed, without limitation, as described above in reference to FIGS. 1-3.

Still referring to FIG. 4, generating the language model may include generating at least a designer-specific language model; this may be performed, without limitation, as described above in reference to FIG. 1. Alternatively or additionally, generating the language model may include generating at least a manufacturer-specific language model; this may be performed, without limitation, as described above in reference to FIG. 1.

Figure 5:
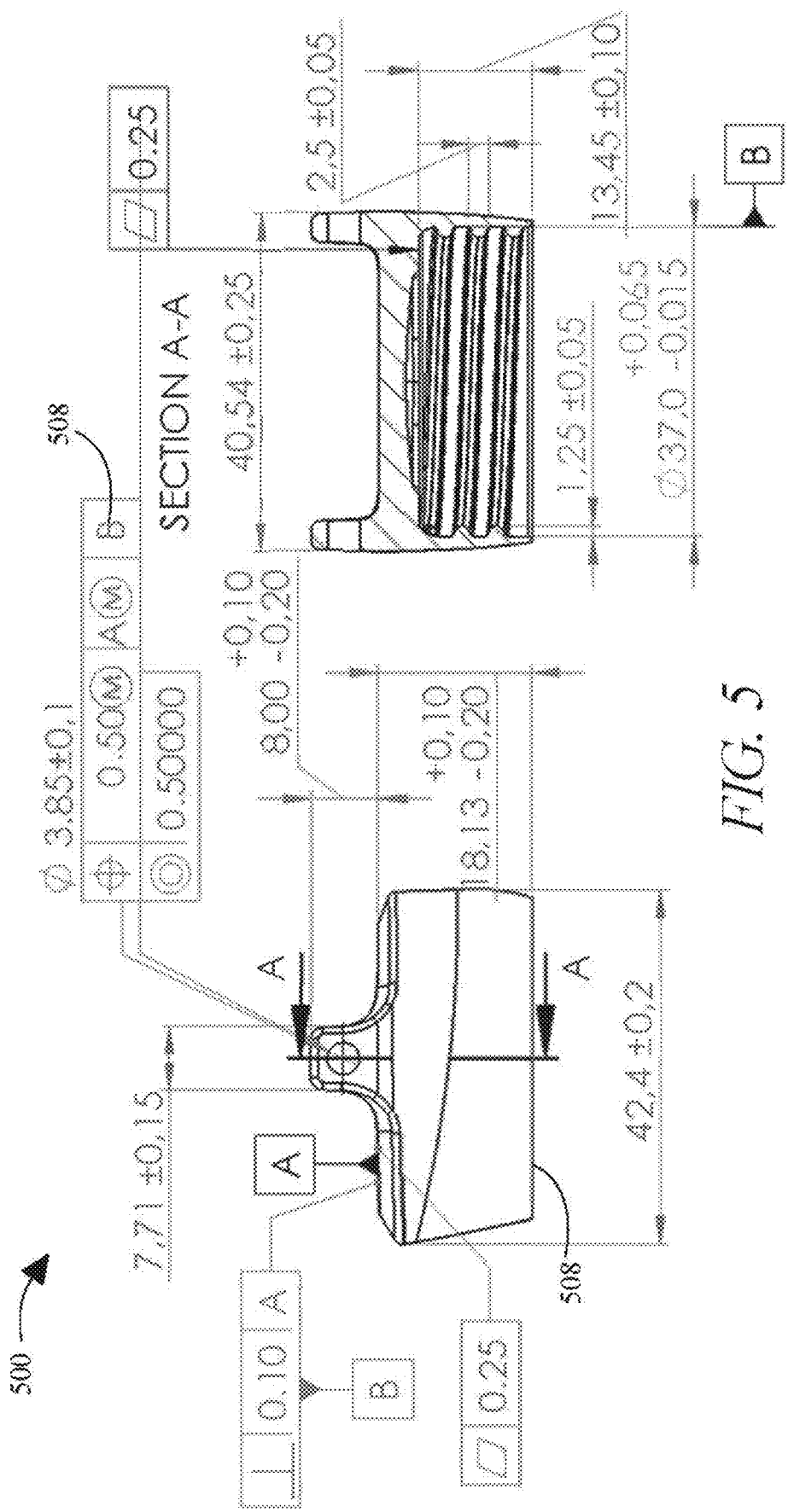
FIG. 5 is an exemplary illustration of an annotated file containing hybrid textual and image data.
Figure 6:
FIG. 6 is an exemplary illustration of a geometric model.

At step 410, manufacturing instruction generator 104 receives at least a geometric model 136 and at least an annotated file describing at least a product to manufacture. In an embodiment, at least an annotated file may include at least a file containing a combination of text and images. FIG. 5 illustrates an exemplary embodiment of an annotated file 500. Annotated file 500 may include one or more images 504, which may include without limitation two-dimensional drawings such as line drawings, wireframe drawings, blueprints, or the like. Annotated file 500 may include one or more words 508, as defined above, annotating images. Words 508 may include, without limitation, words, characters, symbols, acronyms, or the like. Annotated file 500 may be generated together with a geometric model 136. FIG. 6 illustrates an exemplary view of a geometric model 136 600 for illustrative purposes; geometric model 136 600 may be represented using polygonal surfaces, geometric primitives combined to form a three-dimensional whole, wireframes, STL format, or the like.

Referring again to FIG. 4, manufacturing instruction generator 104 may receive annotated file and/or geometric model 136 from a designer device 112a-b via a direct wired or wireless connection, over a network such as the Internet, and/or via a portable memory and/or memory device. Designer device 112a-b and/or a person and/or entity operating designer device 112a-b may transmit identity of designer device 112a-b, person, or entity in conjunction with annotated file and/or geometric model 136; for instance, a user of designer device 112a-b may log onto system 100, transmit an account identifier and/or identifying certificate to initiate a session, or the like.

At step 415, and still referring to FIG. 4, manufacturing instruction generator 104 extracts one or more words from the at least a first annotated file; this may be performed using any process, process step, and/or component as described above. At least an annotated file may include any file suitable for use as at least a training annotated file. Manufacturing instruction generator 104 and/or extractor 120 may extracting words from the annotated file; this may be performed according to any process or process steps described above for extraction of one or more words from at least a training annotated file.

At step 420, manufacturing instruction generator 104 determining at least an interrogator 132 output from the at least a geometric model 136; this may be performed as described above in reference to FIGS. 1-3.

At step 425 manufacturing instruction generator 104 generates at least a textual instruction from the extracted words using the at least a language model and the at least an interrogator 132 output. Manufacturing instruction generator 104 may generate one or more textual instructions for manufacturers from the extracted words using language model 128. In an embodiment, generating one or more textual instructions for manufacturers may include matching each word of one or more words to a representation of the word in language model 128, and returning one or more textual instructions for manufacturers based on one or more associations in language model 128 between the representation of the word and the one or more textual instructions for manufacturers; returned one or more textual instructions for manufacturers may include a manufacturing instruction having a greatest degree of association with a word. For instance, where a word is represented by a vector, a manufacturing instruction represented by a vector having the greatest vector similarity, based on cosine similarity and/or other geometric measure of vector similarity, to the vector representing the word may be returned. Alternatively or additionally, a plurality of textual instructions for manufacturers having relatively high degrees of similarity to a word may be returned. In embodiment, multiple words may relate to a single manufacturing instruction; for instance, there are some materials that may be referenced by many different names of varying classification value. As a non-limiting example presented for illustrative purposes only, a material that may be classified as Aluminum 6061-T6 may alternatively or additionally be classified with over 15 different string pointers on manufacturing prints. Machine-learning program may automatically determine which words from a dataset of thousands of words are truly the most important and definitively descriptive on certain variable values and use such words to identify at textual instructions for manufacturers.

Still referring to FIG. 4, system 100 may alternatively or additionally perform a permission keyword searching strategy; this may be performed by searching tokenized text, such as text tokenized from one or more annotated files as described above, for keywords relating to one or more textual instructions for manufacturers. One or more databases may store many possible textual instructions for manufacturers; for instance, system 100 may include a database of many possible materials used in manufacturing. Such a database may include, without limitation, over a thousand materials used across many manufacturing processes. The names of all the textual instructions for manufacturers may be tokenized and collected into a comprehensive lookup table that is referenced while parsing the text within an annotated file. For instance and without limitation, the material description "Stainless Steel 17-4 PH" may be tokenized into the following pieces: ["stainless", "steel", "17-4", "ph"]. The lookup table also may also include decision tree functionality, where certain high-level keywords that aren't necessarily in the tokenized names of the materials from our database may activate lower branches of the tree. For example, tokens like "ss," which humans understand as "stainless steel," may be used as another high-level pointer that activates all the branches of stainless-steel type materials in the database. As a result, after performing a tokenized keyword search for every material in our database, it may be possible to collect a list of materials that could possibly be found in the pdf. This list may be compared to results produced using language model 140; results from either the list or the model that do not match may be discarded or weighted. Keyword searching may further be used to identify textual instructions for manufacturers, such as without limitation instances of tolerances or threading operation, by looking for typical symbols associated with such instructions, such as a plus/minus sign or a circle with a slash through it.

In an embodiment, and still referring to FIG. 4, manufacturing instruction generator 104 may further process a plurality of textual instructions for manufacturers relating to a word of one or more words to remove ambiguous or contradictory instructions. As a non-limiting example, a single word may map to an instruction to bend a piece of sheet metal at a particular locus, that the bend should have an angle of a certain number of degrees, and that the bend should be bent in a curve having a certain radius; the exemplary plurality of textual instructions for manufacturers in this case may not be contradictory or ambiguous. However, if the same word maps to a first manufacturing instruction specifying a first bend radius and/or angle and to a second manufacturing instruction specifying a second bend radius and/or angle that differs from the first, instructions may be contradictory; this may be resolved, e.g., by reference to a database or other record of past interactions with a particular designer, such as one or more indications that the designer producing at least an annotated file used the word in question in the past to indicate the first bend radius and/or angle, such that manufacturing instruction generator 104 discards the second. For instance, and without limitation, certain manufacturing shops may typically only quote a certain suite of materials and finishes, and even more so, certain customers usually only ask for a smaller suite of materials and finishes. This supplier and/or buyer historical context may be used to inform classification decisions, especially when the outputs from the classification algorithm have low associated confidence. When looking through this historical context, the classification algorithm may actually teach itself to more quickly extract information by letting the customer history inform guardrails for the search algorithm. If a customer has only ever asked for quotes on two different types of materials, it may be possible to constrain the keyword search parameters, as described above, to those classes of materials to improve extraction speed. Alternatively or additionally, such ambiguities and/or contradictions may be eliminated by generation of a designer-specific language model 128 as described in further detail below. In an embodiment, an overall approach for these optimization algorithms may be to find instruction(s) that are most likely to correspond to the data found in the one or more annotated files. Likelihood, in this probabilistic sense, may be proportional to the probability function of a particular manufacturing instruction being present given the source data. When a token or set of tokens has some correlation with more than one manufacturing instruction, the instruction associated with highest probability may be presented to the user. In another embodiment, multiple instructions may be presented for human disambiguation if likelihood of multiple instructions are above a threshold or the likelihood of multiple instructions are close to each other within some threshold. Various algorithms described in this disclosure may produce maximum likelihood estimates or output a likelihood score for a hypothesis given source data.

In testing prototypes, it has been found that a combinatorial NLP machine learning classification, keyword permission searching, and customer history application technique boasts high accuracy of variable detection (>90%) and low frequency of false positives (<2%) across the testing dataset. It is anticipated that the accuracy of this system and method will improve from exposure to additional data owing to the nature of machine learning.

In an embodiment, and still referring to FIG. 4, manufacturing instruction generator 104 may generate at least a textual instruction for a manufacturer by identifying a designer that produced the at least an annotated file, retrieving a designer-specific language model corresponding to the designer, and generating the at least a textual instruction using the designer-specific language model. Designer-specific language model may be produced as described above and may be stored in memory of manufacturing instruction generator 104, such as in a database or the like. Manufacturing instruction generator 104 may identify designer via a user account, user identifier, account number, or the like associated with the designer; in general any datum suitable for identifying a person, entity and/or device may be used. Retrieval of designer-specific language model may be performed using identifying data to query a database and/or data store, or to identify a data structure related to designer which stores designer-specific language model. Designer-specific language model may alternatively or additionally be retrieved by identifying a group to which designer belongs and retrieving a designer-specific language model corresponding to the group.

Continuing to refer to FIG. 4, manufacturing instruction generator 104 may generate at least a textual instruction for a manufacturer by identifying a manufacturer to manufacture a part based on the least an annotated file and/or geometric model 136, retrieving a manufacturer-specific language model corresponding to the manufacturer, and generating the at least a textual instruction using the manufacturer-specific language model. Manufacturer-specific language model may be produced as described above and may be stored in memory of manufacturing instruction generator 104, such as in a database or the like. Manufacturing instruction generator 104 may identify manufacturer via a user account, user identifier, account number, or the like associated with the manufacturer; in general any datum suitable for identifying a person, entity and/or device may be used. Retrieval of manufacturer-specific language model may be performed using identifying data to query a database and/or data store, or to identify a data structure related to manufacturer which stores manufacturer-specific language model. Manufacturer-specific language model may alternatively or additionally be retrieved by identifying a group to which designer belongs and retrieving a manufacturer-specific language model corresponding to the group.

Still referring to FIG. 4, manufacturing instruction generator 104 may use interrogator 132 outputs for selection of at least a textual instruction for manufacturers in any way described above. For instance, and without limitation, manufacturing instruction generator 104 may generate a plurality of candidate textual instructions using a language processor 120 as described above, and use interrogator 132 outputs to select at least a textual instruction for a manufacturer from the plurality of candidate textual instructions; selection may be performed by filtering out language model 128 outputs that are not consistent with manufacturability, materials requirements, process requirements or the like as determined from, using, and/or in interrogator 132 outputs, including without limitation using geometry classifier 140 as described above. As another non-limiting example, selection may be performed by weighting language model 128 outputs using interrogator 132 outputs, including without limitation using outputs from geometry classifier 140 as described above. Alternatively or additionally, where language model was trained with training data including interrogator 132 outputs as described above, language model output itself may be generated using one or more interrogator 132 outputs, for instance as described above in reference to FIGS. 1-3.

Continuing to refer to FIG. 4, manufacturing instruction generator 104 may present the at least a manufacturing instruction to a user in a user interface 152 140 displaying on a user device. User interface 152 140 may include, without limitation, a user interface 152 140 generating UI display 300 300 as described above in reference to FIG. 3. In an embodiment, each manufacturing instruction of the at least a manufacturing instruction may belong to a category including a plurality of textual instructions for manufacturers; category may belong to a plurality of categories. As noted above, user interface 152 140 and/or UI display 300 300 may include at least a category option display element 304 304; at least a category option display element 304 may permit a user to select a manufacturing instruction from plurality of textual instructions for manufacturers included in a category. manufacturing instruction generator 104 may automatically select a manufacturing instruction of the plurality of textual instructions for manufacturers included in the category based on the at least a manufacturing instruction and display the selected manufacturing instruction to the user. For instance, and without limitation, a drop-down list may be initially populated with a "default" value selected using at least a manufacturing instruction. Manufacturing instruction generator 104 and/or user interface 152 140 may receive a user command modifying the at least a manufacturing instruction, such as a selection of a different value from a drop-down, selection of a radio button corresponding to a different value, and/or a textual entry. Manufacturing instruction generator 104 may generate a second training set 124 including the second annotated file and the modified at least a manufacturing instruction. Second training set 124 may be used to update language model 128, for instance as described below.

Still referring to FIG. 4, manufacturing instruction generator 104 may receive a second training set 124. Second training set 124 may include at least an annotated file describing at least a second product to manufacture, the at least an annotated file containing one or more textual data. Second training set 124 may include at least an instruction set containing one or more textual instructions for manufacturers to manufacture the at least a second product. Second training set 124 may be received by generating second training set 124 as a result of user feedback, such as without limitation receiving user modifications to the at least a manufacturing instruction as described above. Second training set 124 may be manufacturer-specific; that is, first training set 116 may represent textual instructions for manufacturers for manufacturing the at least a first product by at least a first manufacturer, which may include a plurality of manufacturers. At least a first training set 116 may, for instance and without limitation, include annotated files and related textual instructions for manufacturers for a large number of processes requested by a large number of designers and/or with a large number of manufacturers. Second training set 124 may represent textual instructions for manufacturers for manufacturing the at least a second product by at least a second manufacturer; at least a second manufacturer may include a subset of at least a first manufacturer, may include manufacturers that are not in at least a first manufacturer, and/or may be distinct from at least a first manufacturer. In an embodiment, at least a second manufacturer may use some instructions, or relationships of words to instructions, in a distinct manner from at least a first manufacturer; as a result, language model 128 may be less accurate for at least a second manufacturer.

Continuing to refer to FIG. 4, second training set 124 may be designer-specific; that is, first training set 116 may represent textual instructions for manufacturers for manufacturing the at least a first product for at least a first designer, which may include a plurality of manufacturers. At least a first training set 116 may, for instance and without limitation, include annotated files and related textual instructions for manufacturers for a large number of processes requested by a large number of designers and/or with a large number of manufacturers. Second training set 124 may represent textual instructions for manufacturers for manufacturing the at least a second product for at least a second designer; at least a second designer may include a subset of at least a first designer, may include designers that are not in at least a first designer, and/or may be distinct from at least a first designer. In an embodiment, at least a second designer may use some instructions, or relationships of words to instructions, in a distinct manner from at least a first designer; as a result, language model 128 may be less accurate for at least a second designer.

Still viewing FIG. 4, manufacturing instruction generator 104 may extract one or more second words from the at least an annotated file; this may be performed using any process, process step, and/or technique for extracting one or more words from at least a training annotated file. Manufacturing instruction generator 104 may update language model 128 using the one or more second words; this may produce a language model 128 that is specific to at least a second manufacturer and/or at least a second designer. As a non-limiting example, updating may begin with language model 128 as produced from first training set 116; for instance, mathematical and/or geometric associations between words and textual instructions for manufacturers during updating process may initially be identical to those derived using first training set 116. Updating may modify associations as a function of second training set 124; for instance, second training set 124 may associate some words with textual instructions for manufacturers identically or similarly to first training set 116, leading to associations that are not modified, while second training set 124 may associate other words with textual instructions for manufacturers in a different way from first training set 116, causing the latter associations to be modified. In an embodiment, updating method may weight or otherwise emphasize associations from second training set 124 in updating process; this may cause updated associations to shift to reflect second training set 124 even where second training set 124 is substantially smaller than first training set 116. Updating may be accomplished by executing any natural language processing program or algorithm as described above; for instance, where algorithm used to generate language model 128 was iterative, updating may include adding additional iterations to the method, using second training set 124. In an embodiment, user-defined lookup rules may be received from a user and used to add to second training set 124 and/or keyword lookup process.

Continuing to refer to FIG. 4, manufacturing instruction generator 104 may initiate manufacture of the at least a first product. Initiation of manufacture may include performance of a first step in the removal from or deposition of material to create part; first step may include a particular milling or cutting operation, such as the performance of a registration cut, a first deposition of material in a fused deposition modeling process, or the like. First step may include location of a workpiece at an automated manufacturing device 108; location may include placement in a precise position and/or registration within a coordinate system used by automated manufacturing device 108 to guide particular manufacturing steps. First step may include generation of a control instruction initiating manufacturing steps; generation of a control instruction may include transmission of a signal to initiate manufacture and/or transmission of any machine control instruction sets generated as described above, including without limitation transmission of information for localized and machine-specific machine-control instruction generation. Transmission may be direct or indirect; for instance, transmission may involve transmission to a remote device that relays transmission to an automated manufacturing device 108 or computing device coupled thereto, or transmission to an auxiliary computing device or computer memory for transport to the automated manufacturing device 108 and/or computing device coupled thereto. System may produce toolpaths for use by automated device; such toolpaths may instruct a device to produce all or a portion of the part. For example, a toolpath may provide for bulk volume removal of a CNC machined part, which will then be further surfaced/refined by the manufacturer.

Still referring to FIG. 4, in an embodiment, candidate instructions and/or inferred instructions, including without limitation textual instructions for manufacturers as described above, for using a particular source material may be used either to automatically procure that material from a supplier, or to create an additional manufacturing instruction to procure that material at a later date or to obtain that material from stock. In a non-limiting example, material may be purchased from an online service with an API enabling the manufacturing instruction generator to automatically procure the material. In another embodiment, candidate instructions may refer to standard hardware components, such as screws, nuts, bolts, fasteners, motors, connectors, and the like; these standard hardware components may be automatically procured via an online service with API or a secondary instruction may be created to procure that hardware at a later date or to obtain that hardware from stock.

Embodiments of the disclosed systems and methods improve automated manufacturing processes by generating textual instructions for manufacturers from user-submitted files more flexibly and accurately than existing systems. Use of language processing algorithms that process and store statistical correlations between words instructions may enable system to derive textual instructions for manufacturers from textual data in a manner that permits systems as disclosed herein to simulate, or even improve upon, expert persons' decision process, albeit through fundamentally different procedure using enhancements to computerized storage and mathematical and/or statistical processing of data.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
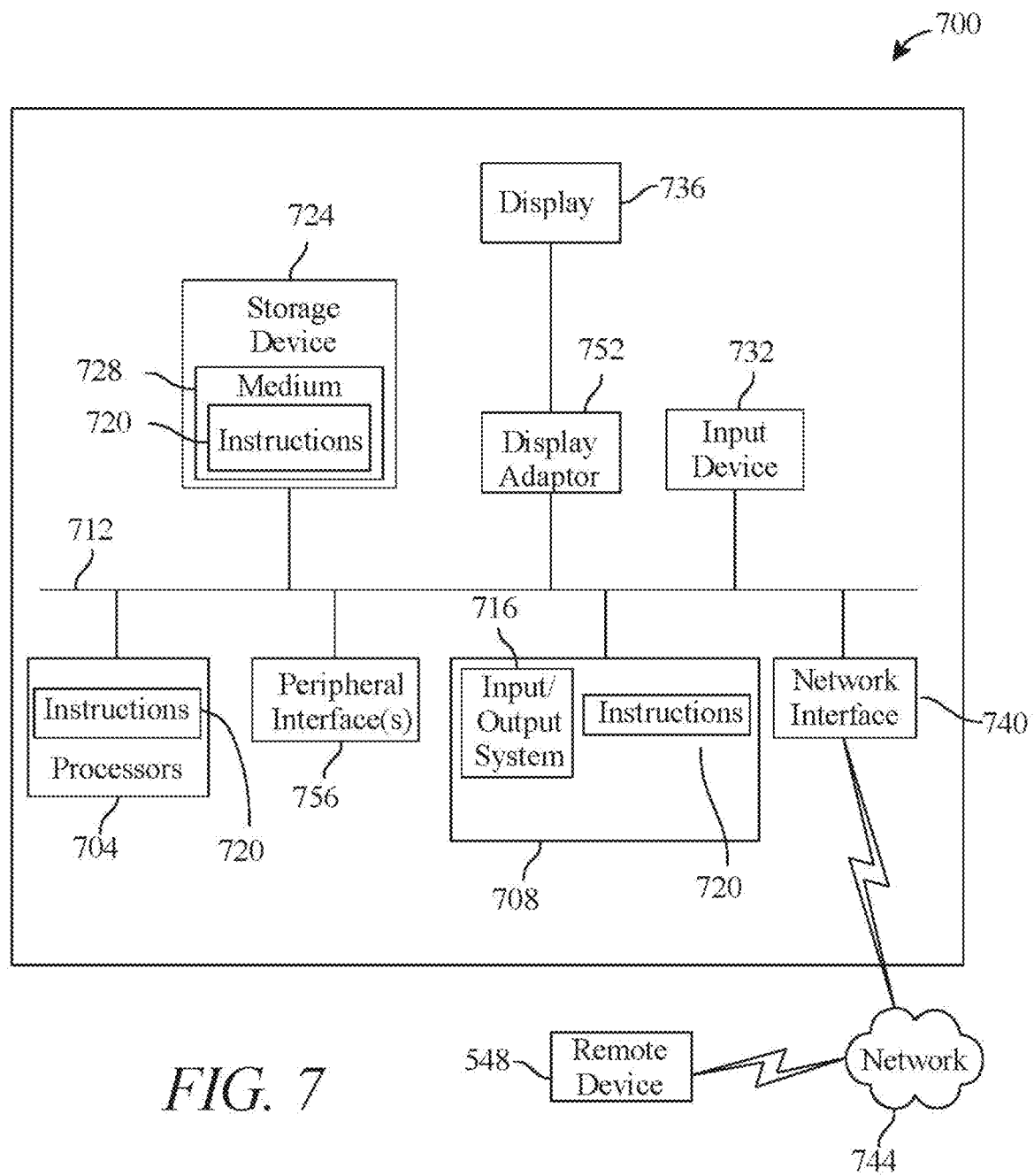
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve the above-described systems and methods. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of generating textual instructions for manufacturers from hybrid textual and image data, the method performed by at least a computing device and comprising:
   generating, from a dataset including a plurality of textual data extracted from annotated files describing products to manufacture and a plurality of correlated textual instructions for manufacturers, at least a language model, wherein the at least a language model receives textual data as inputs and produces textual instructions for manufacturers as outputs, wherein generating the at least a language model further comprises generating the at least a language model by a machine-learning algorithm using the dataset as a training data set;

receiving at least a geometric model and at least an annotated file describing at least a product to manufacture;

extracting one or more words from the at least an annotated file;

determining at least an interrogator output from the at least a geometric model; and generating at least a textual manufacturing instruction from the extracted words using the at least a language model and the at least an interrogator output, wherein generating the at least a textual manufacturing instruction further comprises:

identifying a designer that produced the at least an annotated file;

identifying a manufacturer to manufacture the at least a product based on the at least an annotated file;

retrieving a designer-specific language model corresponding to the designer;

retrieving a manufacturer-specific language model corresponding to the manufacturer; and generating the at least a textual manufacturing instruction using a combination of the designer-specific language model and the manufacturer-specific language model.

2. The method of claim 1, wherein generating the language model further comprises generating the dataset, wherein generating the dataset further comprises:

receiving a plurality of annotated files describing products to manufacture, the plurality of annotated files correlated to the plurality of textual instructions;

extracting the plurality of textual data from the plurality of annotated files; and generating the dataset using the plurality of textual data and the plurality of textual instructions.

3. The method of claim 1, wherein the at least an annotated file includes at least a file containing a combination of text and images.

4. The method of claim 1 further comprising presenting the at least a textual manufacturing instruction to a user in a user interface displaying on a user device.

5. The method of claim 4, wherein:
each textual manufacturing instruction of the at least a textual manufacturing instruction belongs to a category, of a plurality of categories, including a plurality of textual instructions for manufacturers; and
the user interface further comprises at least a category option display element permitting the user to select a textual manufacturing instruction from the plurality of textual instructions for manufacturers included in a category of the plurality of categories.

6. The method of claim 4 further comprising:
receiving a user command modifying the at least a textual manufacturing instruction; and
generating a second training set including a second annotated file and the modified at least a textual manufacturing instruction.

7. The method of claim 6 further comprising updating the language model using the second training set.

8. The method of claim 1 further comprising:
receiving a second training set, wherein the second training set further includes:
at least a second annotated file describing at least a second product to manufacture, the at least a second annotated file containing one or more textual data; and
at least an instruction set containing one or more textual instructions for manufacturers to manufacture the at least a second product;
extracting one or more second words from the at least a second annotated file; and
updating the language model using the one or more second words.

9. The method of claim 1, wherein the training data set comprises a combination of textual and image data correlated with textual manufacturing instruction data of the training data set.

10. The method of claim 1, wherein determining the at least an interrogator output comprises identifying a starting material for manufacturing the at least a product to manufacture based on uniformity of a thickness of the starting material and bendability of the starting material.

11. A system for generating textual instructions for manufacturers from hybrid textual and image data, the system comprising at least a computing device designed and configured to:

generate, from a dataset including a plurality of textual data extracted from annotated files describing products to manufacture and a plurality of correlated textual instructions for manufacturers, at least a language model, wherein the at least a language model receives textual data as inputs and produces textual instructions for manufacturers as outputs, wherein generating the at least a language model further comprises generating the at least a language model by a machine-learning algorithm using the dataset as a training data set;

receive at least a geometric model and at least an annotated file describing at least a product to manufacture;

extract one or more words from the at least an annotated file;

determine at least an interrogator output from the at least a geometric model; and generate at least a textual manufacturing instruction from the extracted words using the at least a language model and the at least an interrogator output, wherein generating the at least a textual manufacturing instruction further comprises:

identifying a designer that produced the at least an annotated file;

identifying a manufacturer to manufacture the at least a product based on the at least an annotated file;

retrieving a designer-specific language model corresponding to the designer;

retrieving a manufacturer-specific language model corresponding to the manufacturer; and generating the at least a textual manufacturing instruction using a combination of the designer-specific language model and the manufacturer-specific language model.

12. The system of claim 11, wherein the computing device is further configured to generate the language model by generating the dataset, wherein generating the dataset further comprises:

receiving a plurality of annotated files describing products to manufacture, the plurality of annotated files correlated to the plurality of textual instructions;

extracting the plurality of textual data from the plurality of annotated files; and generating the dataset using the plurality of textual data and the plurality of textual instructions.

13. The system of claim 11, wherein the at least an annotated file includes at least a file containing a combination of text and images.

14. The system of claim 11 wherein the computing device is further configured to present the at least a manufacturing instruction to a user in a user interface displaying on a user device.

15. The system of claim 14 wherein the computing device is further configured to:

receive a user command modifying the at least a textual manufacturing; and generate a second training set including a second annotated file and the modified at least a textual manufacturing instruction.

16. The system of claim 15, wherein the computing device is further configured to update the language model using the second training set.

17. The system of claim 11, wherein the training data set comprises a combination of textual and image data correlated with textual manufacturing instruction data of the training data set.

18. The system of claim 11, wherein determining the at least an interrogator output comprises identifying a starting material for manufacturing the at least a product to manufacture based on uniformity of a thickness of the starting material and bendability of the starting material.

19. A non-transitory machine-readable storage medium containing machine-executable instructions for estimating manufacturing parameters, the machine-executable instructions comprising:

generating, from a dataset including a plurality of textual data extracted from annotated files describing products to manufacture and a plurality of correlated textual instructions for manufacturers, at least a language model, wherein the at least a language model receives textual data as inputs and produces textual instructions for manufacturers as outputs, wherein generating the at least a language model further comprises generating the at least a language model by a machine-learning algorithm using the dataset as a training data set;

receiving at least a geometric model and at least an annotated file describing at least a product to manufacture;

extracting one or more words from the at least an annotated file;

determining at least an interrogator output from the at least a geometric model; and generating at least a textual manufacturing instruction from the extracted words using the at least a language model and the at least an interrogator output, wherein generating the at least a textual manufacturing instruction further comprises:

identifying a designer that produced the at least an annotated file;

identifying a manufacturer to manufacture the at least a product based on the at least an annotated file;

retrieving a designer-specific language model corresponding to the designer;

retrieving a manufacturer-specific language model corresponding to the manufacturer; and generating the at least a textual manufacturing instruction using a combination of the designer-specific language model and the manufacturer-specific language model.

20. The medium of claim 19, wherein determining the at least an interrogator output comprises identifying a starting material for manufacturing the at least a product to manufacture based on uniformity of a thickness of the starting material and bendability of the starting material.

* * * * *